United States Patent
Shinozaki et al.

[11] Patent Number: 5,989,324
[45] Date of Patent: Nov. 23, 1999

[54] RECORDING SOLUTION FOR VAPORIZATION TYPE HEAT TRANSFER RECORDING

[75] Inventors: Kenji Shinozaki; Hideki Hirano; Miyuki Kuromiya, all of Kanagawa, Japan

[73] Assignee: Sony Corporation, Tokyo, Japan

[21] Appl. No.: 08/951,505

[22] Filed: Oct. 16, 1997

[30] Foreign Application Priority Data

Oct. 16, 1996 [JP] Japan ................................ 8-295786

[51] Int. Cl.$^6$ ................................................. C09D 11/00
[52] U.S. Cl. ................................. 106/31.27; 106/31.57; 106/31.58
[58] Field of Search ............................. 106/31.27, 31.57, 106/31.58

[56] References Cited

U.S. PATENT DOCUMENTS 5,091,004  2/1992  Tabayashi et al. ................ 106/31.57
5,781,210  7/1998  Hirano et al. ..................... 106/31.27

Primary Examiner—Mark L. Bell
Assistant Examiner—Veronica F. Faison
Attorney, Agent, or Firm—Hill & Simpson

[57] ABSTRACT

The present invention provides a recording solution for vaporization type heat transfer recording which produces no precipitate in a recording operation and thus no problem of burning in a vaporization portion.

The recording solution for vaporization type heat transfer recording in which the recording solution is vaporized to be transferred to a recording material contains a dye, a solvent having a melting point of 0° C. or less, and a compatibilier for increasing the solubility of the dye in the solvent. Particularly, when the temperature at which the weight loss by vaporization is 10% in thermogravimetric analysis at a rate of temperature rise of 20 C./min., is defined as the vaporization start temperature, the different between the vaporization start temperatures of any desired two of the dye, the solvent and the compatibilizer is set to 100° C. or less.

10 Claims, 4 Drawing Sheets

RECORDING SOLUTION FOR VAPORIZATION TYPE HEAT TRANSFER RECORDING

BACKGROUND OF THE INVENTION

1. Field of the Invention

The present invention relates to a recording solution used for vaporization type heat transfer recording in which a recording solution is transferred to a recording material by vaporization.

2. Description of the Related Art

In recent years, as coloration of video cameras, computer graphics, etc. has progressed, coloration of not only monocolor recording but also hard copying has been increasingly needed. Therefore, color hard copy systems such as a dye diffusion type heat transfer recording system (sublimation type heat transfer recording system), a melting heat transfer recording system, an ink jet recording system, an electrophotographic recording system, a heat development silver salt recording system, etc. have been proposed. Of these recording systems, the dye diffusion type heat transfer recording system and the ink jet recording system can be used as a system for easily outputting a high-quality image by a simple apparatus.

In the dye diffusion type heat transfer recording system, an ink ribbon comprising an ink layer deposited on a base substrate and containing a high concentration of transfer dye dispersed in an appropriate binder, and a transfer material (for example, photographic paper or the like) having a dye receiving layer comprising a dyeing resin for receiving the dye are held between a platen roller and a thermal head, which are provided in a printer, so as to adhere to each other under predetermined pressure, and heat is supplied to the ink layer on the back side of the ink ribbon from the thermal head according to image information to thermally transfer the dye to the dye receiving layer from the ink layer. This transfer operation is repeated for image signals of each of yellow, magenta and cyan which are the subtractive primary colors, to obtain a full color image having continuous gradation. Therefore, the dye diffusion type heat transfer recording system facilitates miniaturization and maintenance of a recording system and has immediacy of image formation, and attracts attention as an excellent technique for obtaining high quality images equivalent to silver salt color photographs.

However, in the dye diffusion type heat transfer recording system, exclusive photographic paper is required for obtaining a high quality image, and large amounts of wastes are produced due to disposal of the ink ribbon. This system thus has the problem of increasing the running cost, and the disposal of large amounts of wastes is undesirable from the viewpoint of global environment. These problems are also caused in the melting heat transfer recording system.

The heat development silver salt recording system is capable of obtaining high-quality images, but has the problems of high running cost and high equipment cost due to the use of exclusive photographic paper and a disposable ink ribbon.

On the other hand, in the ink jet recording system, as disclosed in Japanese Patent Examined Publication Nos. 61-59911 and 5-217, droplets of a recording solution are flown from a nozzle provided in a recording head by a system such as a continuous vibration generating system (piezo system), a thermal system (bubble jet system) or the like, and adhered to the transfer material to recording an image. Since the ink jet recording system uses as the recording solution a solution which can be absorbed by plain paper, the system enables transfer to plain paper. The ink jet recording system produces substantially no waste and thus has the property of low running cost. Recently, particularly, the thermal system which can easily output color images has increasingly been popularized.

However, in principle, the ink jet system is difficult to obtain density gradation within a pixel, and is thus difficult to realize a high-quality image equivalent to a silver salt photograph within a short time, which can be achieved by the dye diffusion type heat transfer system.

Namely, in the conventional ink jet recording system, since one ink droplet ejected from the nozzle of an ink jet printer forms one pixel, and, in principle, it is difficult to obtain gradation in the pixel and impossible to form a high quality image. Although attempts have been made to obtain expression with pseudo-gradation by the dither method employing the high resolution of ink jet recording, image quality equivalent to that obtained by the sublimation type heat transfer system cannot be obtained, and the transfer speed is significantly decreased.

The electrophotographic system has low running cost and a high transfer speed, but has high equipment cost.

As described above, in present conditions, the conventional recording systems cannot simultaneously satisfy all requirements such as image quality, running cost, equipment cost, transfer time, etc.

As a recording system which simultaneously satisfies these requirements, a non-contact type heat transfer recording system such as a vaporization type (or a dye vaporization type) heat transfer recording system has recently attracted attention in which a recording agent such as a dye itself or a recording solution is vaporized or atomized and transferred to a recording material such as photographic paper or the like (EP 94101201. 5).

In a printer head used in this recording system, a liquid recording agent, e.g., a melted dye or a recording solution obtained by dissolving a dye in a solvent, is introduced into a vaporization portion having a porous structure by the capillary phenomenon, and then held therein. Heat is selectively applied to the liquid recording agent held in the vaporization portion by heating means such as a laser or the like according to recording information to vaporize the recording agent or generate a mist having a diameter of 1 $\mu$m or less. The vaporized recording agent or mist is transferred to the photographic paper positioned opposite to the vaporization portion with a gap of 10 to 300 $\mu$m therebetween. Since the vaporization portion has a porous structure, the surface area of the vaporization portion (heating portion) is increased, and thus the liquid recording agent can be constantly supplied to the vaporization portion by the capillary phenomenon and held therein.

Therefore, in the vaporization type heat transfer recording system, small droplets of the recording agent can be formed, as compared with a known ink jet system. Further, since the number of the droplets of the recording agent can freely be controlled by changing the heating energy applied to the recording material according to recording information, multivalue density gradation is possible, and an image (for example, a full color image) with quality equivalent to or higher than that of an image obtained by the silver salt system can be recorded.

In addition, in the vaporization type heat transfer recording system, although the recording agent is vaporized or atomized, the ink layer of the ink ribbon need not be heated, and the ink ribbon and the recording material need not be pressed by high pressure, unlike the conventional sublimation type heat transfer recording system. This point is advantageous for decreasing the size and weight of the printer. Also, since the portion (the vaporization portion or heating portion) for vaporizing the recording agent does not contact the recorded material, no heat fusion occurs therebetween, and recording is possible even if the dye and the dye receiving layer region of the recorded material have low compatibility. There is thus the advantage of widening the ranges of design and selection of the dye and the dye receiving layer resin.

As the recording agent applied to this vaporization type heat transfer recording system, a dye itself or a recording solution obtained by mixing a dye and an appropriate solvent can be used, as described above. However, the recording solution has excellent handling properties, and is thus preferably used.

A solution which can be used as the recording solution is one having an appropriate vaporization rate and abrasion rate and sufficient heat resistance, and exhibits a flowing state at 200° C. or less singly or in a mixture with another third component. Specifically, disperse dyes, oil-soluble dyes, basic dyes and acid dyes can be used as the dye, and dibutylphthalic acid, toluene, and ethylnaphthalene can be used as the solvent.

On the other hand, photographic paper suitably used for the vaporization type heat transfer recording system is paper having a transfer surface which need not have high compatibility with the transfer dye but at least has appropriate compatibility therewith, and capable of easily receiving the transfer dye to accelerate development of the original color of the dye, and fixing the dye. For example, in use of a disperse dye, paper having a surface coated with a polyester resin, polyvinyl chloride resins, or acetate resin can preferably used as the photographic paper.

In fixing the dye transferred to the photographic paper, the transferred image may be heated to diffuse the transferred dye on the surface of the paper into the dye receiving layer.

As described above, like the conventional heat transfer recording system, the vaporization type heat transfer recording system enables a reduction in the size of the printer and facilitates maintenance thereof. Also a recorded image can immediately be obtained by the heat transfer operation, and the image obtained has high quality and good gradation.

However, for conventional recording solutions used for the vaporization type heat transfer recording system, no consideration is given to the relative degree of vaporization between the solvent and the dye, and the solvent and the dye are generally combined so that the solvent is more easily vaporized than the dye. Therefore, in a recording operation, i.e., in the process of vaporizing the recording solution, the dye concentration of the recording solution is increased, thereby causing the problem of producing precipitates of the dye. Accordingly, there occurs the problems of deterioration in the transfer efficiency, burning in the vaporization portion due to carbonization of the dye precipitates, etc.

In order to solve these problems, it is considered to form a recording solution by using a dye and a solvent which have substantially the same boiling point or degree of vaporization at the same temperature. However, it is very difficult to find a solvent which has a melting point of room temperature or less, preferably 0° C. or less, and a boiling point within the boiling point range of 300 to 450° C. of usual dyes, and which can sufficiently dissolve the dye.

SUMMARY OF THE INVENTION

The present invention has been achieved for solving the above problems of conventional techniques, and an object of the present invention is to provide a recording solution for a vaporization type heat transfer recording system which produces no precipitate in a recording operation and thus no problem of burning in a vaporization portion.

The inventors found that the above solution can be achieved by adding to a recording solution comprising a dye and a solvent having a melting point of room temperature or less a compatibilizer as a third component for increasing the solubility of the dye to the solvent. This resulted in the achievement of the present invention.

In accordance with the present invention, a recording solution for a vaporization type heat transfer recording system in which the recording solution is vaporized to transfer an image to a recorded material, comprises a dye, a solvent having a melting point of room temperature or less, and a compatibilizer for increasing the solubility of the dye in the solvent.

DETAILED DESCRIPTION OF THE PREFERRED EMBODIMENT

The present invention will be described in detail below.

A recording solution for vaporization type heat transfer recording of the present invention comprises a mixture of a dye and a solvent having a melting point of room temperature or less, and a compatibilizer added to the mixture in order to increase the solubility of the dye in the solvent. The use of such a compatibilizer can increase the solubility of the dye with less changing the degree of vaporization of the solvent and the melting point thereof even if the dye cannot be sufficiently dissolved in the solvent only.

The dye which can be used in the present invention can be selected from known disperse dyes, oil-soluble dyes, acid dyes and basic byes, as in conventional recording solutions.

If the dye content of the recording solution is too low, a sufficient transfer density cannot be obtained. If the dye content is too high, the dye readily precipitates. Therefore, the dye content is preferably 1 to 30% by weight, more preferably 3 to 20% by weight.

As the solvent, in order to keep the recording solution in an oily state at room temperature, a solvent having a melting point of room temperature or less, preferably 0° C. or less, or a melting point which is lowered to 0° C. or less due to the phenomenon of lowering of melting point when the dye and the compatibilizer are dissolved in the solvent is used.

If the solvent content of the recording solution is too low, the dye cannot be sufficiently dissolved. If the solvent content is too high, the dye content is made relatively low, and a sufficient transfer density cannot be obtained. Therefore, the solvent content is preferably 30 to 99% by weight, more preferably 40 to 97% by weight.

Table 1 shows examples of solvents suitable for the normal use of a disperse dye having a boiling point of 350 to 450° C. together with the melting points and the vaporization start temperatures (the temperature where the weight loss by vaporization is 10% in thermogravimetric analysis at a rate of temperature rise of 20° C./min. is defined as the vaporization start temperature) and the boiling points.

Although an agent which can increase the solubility of the dye in the solvent is used as the compatibilizer, an agent having substantially the same vaporization start temperature as the dye and the solvent, and sufficient solubility in the solvent is preferably used. The compatibilizer need not have a melting point of room temperature or less, but preferably has a lower melting point because the solubility in the solvent is high, and precipitates are hardly produced. The compatibilizer may have an indefinite melting point.

If the content of the compatibilizer in the recording solution is too low, the dye cannot be sufficiently dissolved. If the content is too high, the dye content is made relative low, and a sufficient transfer density cannot be obtained. Therefore, the content of the compatibilizer is preferably 1 to 50% by weight, more preferably 1 to 40% by weight. Tables 2 and 3 show examples of compatibilizers suitable for normal use of a disperse dye having a boiling point of 350 to 45° C. together with the vaporization start temperatures and the boiling points.

In selection of the dye, the solvent and the compatibilizer, these are preferably selected in consideration of the vaporization start temperatures thereof. Specifically, if a difference between the vaporization start temperatures of any desired two of the dye, the solvent and the compatibilizer is large, the dye easily precipitates with vaporization. Therefore, these three components are selected so that such a difference is preferably 100° C. or less, more preferably 50° C. or less.

Since the dye, for example, a disperse dye, has a boiling point of 350 to 450° C., the boiling points of the solvent and the compatibilizer are preferably within the range of 250 to 550° C., more preferably 300 to 500° C.

TABLE 1

| Name of solvent | Melting point (° C.) | Vaporization start temperature (° C.) | Boiling point (° C.) |
| --- | --- | --- | --- |
| Benzyl benzoate | 19 | 225 | 323 |
| Dibutyl phthalate | −35 | 238 | 340 |
| Dioctyl phthalate | −50 | 290 | 384 |
| Di-n-octyl phthalate | −25 | 304 | — |
| Diisodecyl phthalate | −53 | 316 | — |
| Benzyl n-butyl phthalate | <0 | 289 | — |
| Dioctyl terephthalate | 30 | 309 | 400 |
| Diisononyl phthalate | −45 | 305 | — |
| Tricresyl phosphate | <−35 | 315 | — |
| Triphenyl phosphite | 22 | 246 | 360 |
| Diethylene glycol benzoate | 20 | 299 | — |
| 1-phenylnaphthalene | <0 | 231 | 325 |
| 1,2-propanediol benzoate | −3 | 263 | — |
| Trihexyl trimellitate | −45.5 | 327 | — |

TABLE 2

| Name of compatibilizer | Vaporization start temperature (° C.) | Boiling point (° C.) |
| --- | --- | --- |
| 1,3-diphenylacetone | 224 | 330 |
| 7,8-benzoquinoline | 246 | 340 |
| Benzophenone | 203 | 305 |
| 2-chlorobenzophenone | 238 | 330 |

TABLE 2-continued

| Name of compatibilizer | Vaporization start temperature (° C.) | Boiling point (° C.) |
| --- | --- | --- |
| 4-cumylphenol | 224 | 335 |
| 3-indolylacetonitrile | 282 | — |
| 1-methylanthracene | 225 | — |
| Triphenyl phosphate | 280 | 377 |
| 2-(4-aminophenyl)-6-methyl benzothiazole | 326 | 434 |
| Anthraquinone | 256 | 381 |
| 1,2-benzanthracene | 301 | 438 |
| Docosane | 255 | 369 |
| Dotriacontane | 329 | 467 |
| Fluoracene | 288 | 384 |
| Octadecanophene | 337 | 425 |
| Phenothiazine | 266 | 371 |
| 9-phenylanthracene | 298 | 417 |
| N-phenylnaphthylamine | 279 | 395 |
| Phenyl sulfone | 254 | 379 |
| m-terphenyl | 283 | 379 |
| Tetracosane | 272 | 391 |

TABLE 3

| Name of compatibilizer | Vaporization start temperature (° C.) | Boiling point (° C.) |
| --- | --- | --- |
| Tetraphenylethylene | 311 | 420 |
| Trioctyl trimellitate | 327 | 414 |
| 1,3,5-triphenylbenzene | 331 | 460 |
| Triphenylene | 298 | 438 |
| 1-benzoyl-4-piperidone | 265 | — |
| Benzyltrisulfide | 262 | — |
| Chlorodimethyloctadecyl silane | 261 | — |
| (R)-(+)-3-hydroxy-3-methyl-4,4,4-trichlorobutyllactone | 259 | — |
| 1-iodooctadecane | 253 | — |
| (s)-(−)-2,2′-isopropylidene bis (4-phenyl-2-oxazoline) | 364 | — |
| 1-isothiocyanate-4-(trans-4-octylcyclohexyl) benzene | 363 | — |
| Methyl heptadecanoate | 311 | — |
| N-methyl-N-octadecyl-1-octadecanamine | 338 | — |
| Methyl 12-oxooctadecanoate | 253 | — |
| 4-nitrobenzenesulfonylchloride | 264 | — |
| 4-(3-oxobutyl)phenylacetate | 244 | — |
| Stearyl chloride | 235 | — |
| Triaryl 1,3,5-benzene tricarboxylate | 322 | — |

The recording solution for vaporization type heat transfer recording of the present invention contains the above dye, solvent and compatibilizer, but it may further contain additive components such as a surfactant, a viscosity adjustor, etc. according to demand.

The recording solution for vaporization type heat transfer recording of the present invention can be produced by uniformly mixing the dye, the solvent, the compatibilizer and additive components which are added according to demand, by a stirrer or the like while appropriately heating.

EXAMPLES

The present invention will be described in further detail below with reference to examples.

A vaporization type heat transfer printer used in examples and comparative examples will be described with reference to the drawings.

Figure 1A:
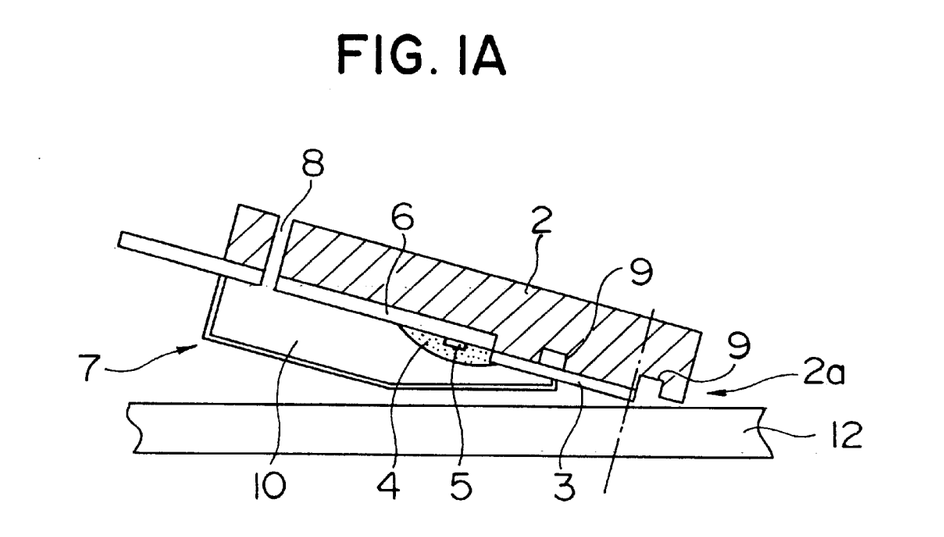
FIG. 1A is a sectional view of a printer head used in examples.
Figure 1B:
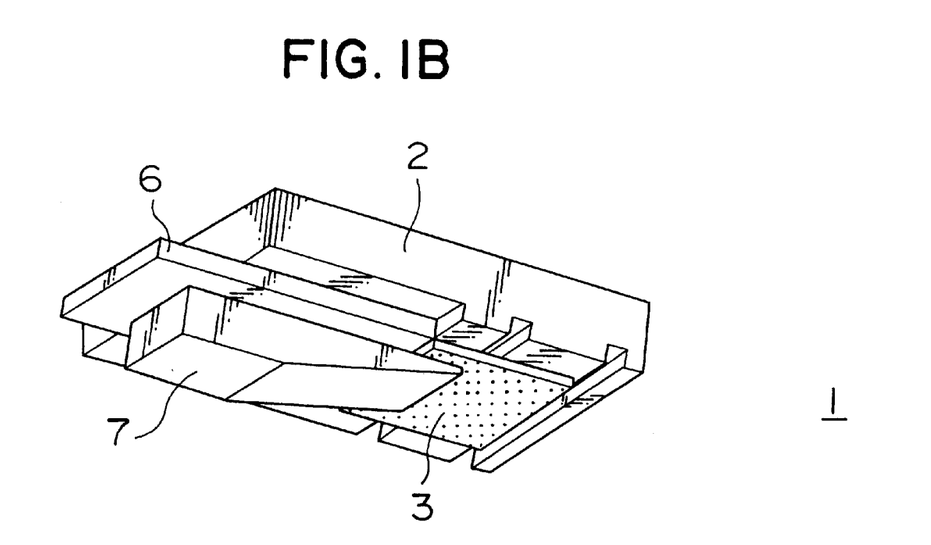
FIG. 1B is a perspective view of the same printer head as viewed from the bottom thereof.
Figure 2:
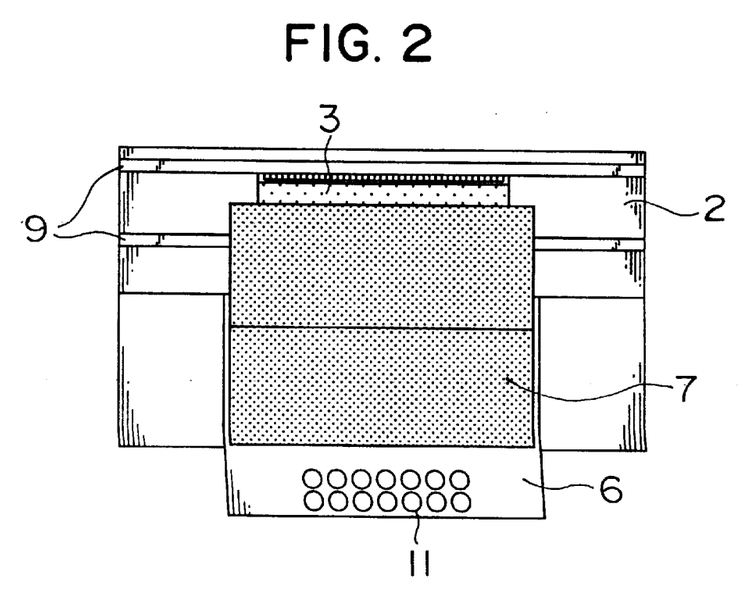
FIG. 2 is a plan view of a printer head used in examples.
Figure 3:
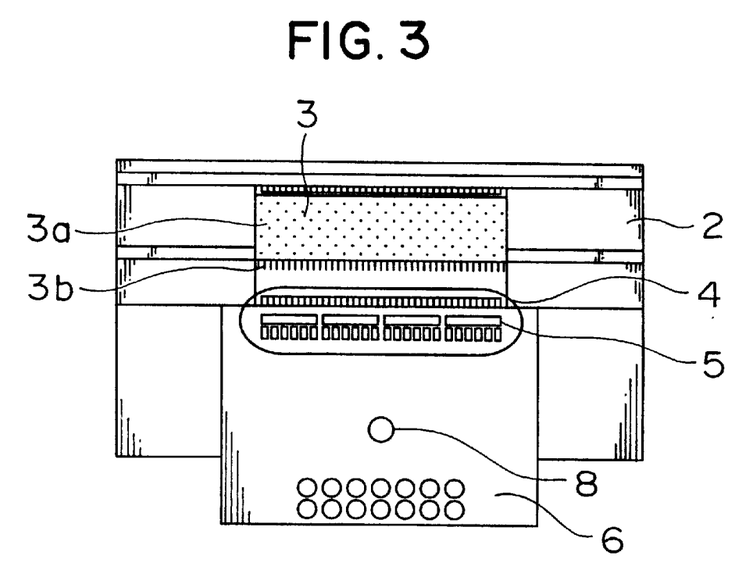
FIG. 3 is a plan view of a printer head used in examples.

Referring to FIG. 1 (FIG. 1A is a sectional view, and FIG. 1B is a perspective view), FIG. 2 (plan view) and FIG. 3 (a plan view without a cover 7 which will be described below), a printer head 1 comprises an aluminum head base 2 also serving as a heat sink, a heater chip 3 having a vaporization portion heated by heaters according to image information, and a recording solution introducing path for introducing the recording solution to the vaporization portion by the capillary function, which are integrally formed on a silicon substrate, a printed board 6 having a driving IC 5 covered with a potting resin 4 and mounted thereon, and wiring formed thereon for supplying a current to each of the heaters according to data about the image transferred, and the cover 7 functioning to protect the driver IC 5 and supply a dye.

In the head base 2 are formed a recording solution introducing hole 8 for introducing the recording solution to the printer head 1, and grooves 9 serving as relief for excessive adhesive which is extruded when the heater chip 3 is bonded to the head base 2. In the cover 7 is formed a recording solution supply path 10 for supplying the recording solution to the recording solution supply path of the heater chip 3. On the printed board 6 is provided connector terminals 11.

The surface of the heater chip 3 is coated with a protective Ni sheet 3a, and sheet resist 3b is formed in lines on the inner side of the Ni sheet 3a in order to form the recording solution introducing paths.

In the heater chip 3 are formed by a lithographic process a plurality of heaters for heating the recording solution to vaporize it, the wiring for applying a signal voltage to each of the heaters on the basis of an image signal to supply a current thereto, and the recording solution introducing path for supplying the recording solution to each of the heaters.

Figure 4:
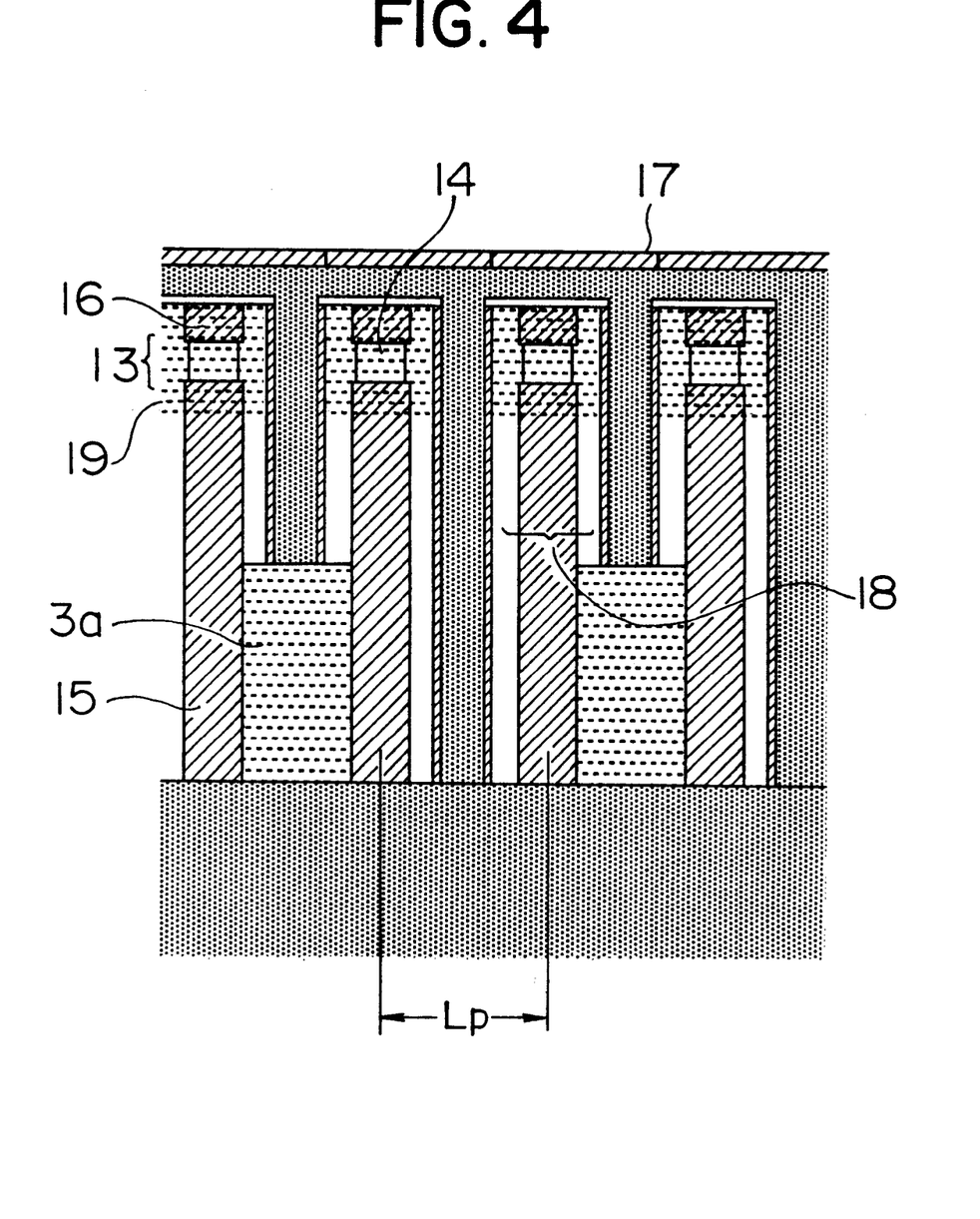
FIG. 4 is a partially enlarged view of a printer head used in examples.

Namely, as shown in FIG. 4 (a partially enlarged view of vaporization portions 13 at the top of the heater chip 3 and the vicinity thereof), for example, a total of 256 heaters 14 are formed with a pitch Lp=84.7 $\mu$m. Since one dot is transferred by one heater 14, resolution of 300 DIP can be realized. Each of the heaters 14 comprises polysilicon having a size of 20 $\mu$m×20 $\mu$m, and an aluminum individual electrode 15 and common electrode 16 for applying a single voltage to supply a current on the basis of an image signal are connected to each of the heaters 14. The vaporization portions 13 is divided by a partition 17 so that the recording solution is contained in the recessed portion (recording solution containing potion 18) surrounded by the partition 17. On each of the heaters 14 and the periphery thereof is provided, as a component of the vaporization portion 13, a group of 13×13 small cylindrical columns having a diameter of 2 $\mu$m, a height of 6 $\mu$m and intervals of 2 m through a $SiO_2$ protective film (not shown).

The height of the small columns 19 is set to the same height as the height from the bottom to the upper side of each of the recording solution containing portions 18, i.e., the height of the partition 17 surrounding the recording solution containing portion 18 of each of the heaters 14. Also the small columns 19 are provided with small spaces therebetween to form a porous structure. Therefore, the porous structure causes the capillary function and thus permits the small columns 19 to hold the recording solution in the recording solution containing portion 18. In addition, when the recording solution is heated by the heaters 14, the surface tension of the recording solution is decreased with a temperature rise, but escape of the recording solution from the vicinity of the surfaces of the heaters 14 can be prevented by the capillary function. Therefore, in transfer of an image, the required recording solution is continuously supplied.

The printer head 1 contacts a recording material (photographic paper) 12 at one end 2a of the base so that the printer head 1 is maintained at a predetermined angle with the recording material 12, as shown in FIG. 1A. It is thus possible to keep the distance between the vaporization portion 13 and the recording material 12 constant.

For example, the center (shown by a one-dot chain line in FIG. 1A) of the heaters 14 of the vaporization portion 13 is at a distance of 1.85 mm from the end 2a of the heat base 2 which contacts the recording material 12, and the angle between the heat base 2 and the recording material 12 is kept at 14° so that the distance between the heaters 14 formed on the silicon substrate having a thickness of 0.4 mm and the recording material 12 is 50 $\mu$m (however, the thickness of an adhesive layer between the silicon substrate and the head base 2 is 10 $\mu$m).

Therefore, the distance between the heaters 14 and the recording material 12 can be set to an any desired value by appropriately changing the distance between the head base end 2a and the center of the heaters and the angle between the recording material 12 and the heat base 2.

Figure 5:
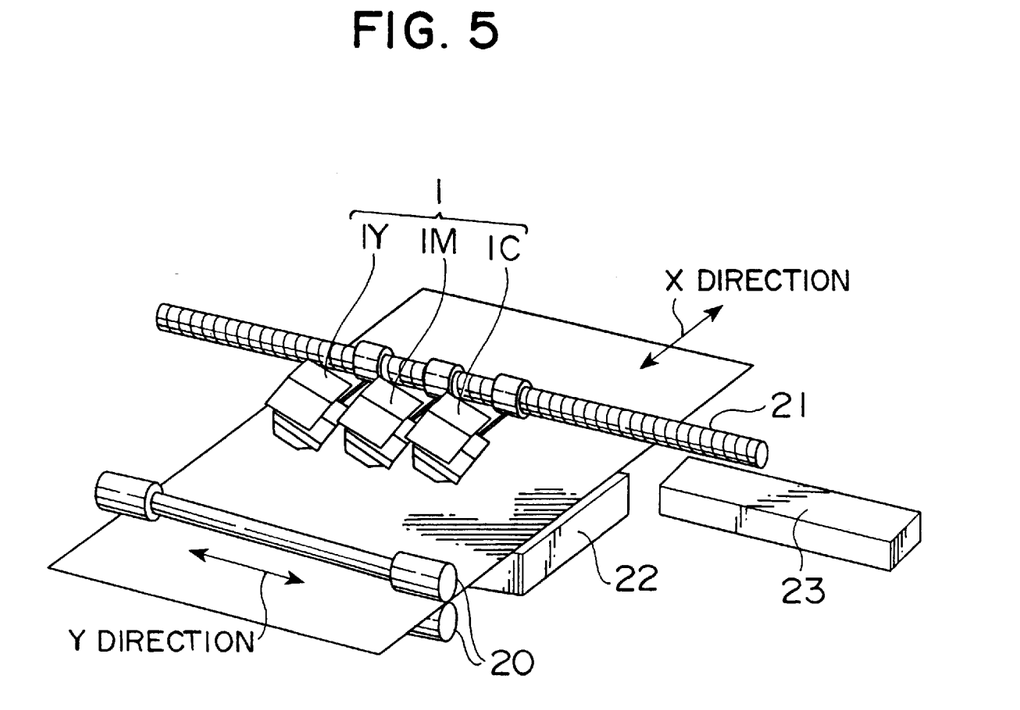
FIG. 5 is a schematic drawing of a serial printer used in examples.

In the examples and comparative examples, a serial printer comprising printer heads 1Y, 1M and 1C provided for yellow (Y), magenta (M) and cyan (C), respectively, as shown in FIG. 5 was used. The printer heads are connected to a head driving circuit substrate (not shown) through a flexible harness.

The serial printer comprises paper feeding rotatable rollers 20 for feeding paper in the longitudinal direction (the X direction), and a head feeding shaft 21 for scanning the printer head in the direction (the Y direction) perpendicular to the X direction. The head feeding shaft 21 can be rotated by a motor (not shown) according to image information to scan the printer head 1. The longitudinal paper feed and the lateral head scanning are alternately carried out.

Since each of the printer heads 1Y, 1M and 1C comprises 256 heaters 14, the serial printer used in the examples has the ability to print 256 lines in one scanning. At the time of end of one scan, the recording material (photographic paper) 12 on a platen 22 is moved for 256 lines by the paper feeding rollers 20 also serving as head supports to start printing at a predetermined position on the photographic paper 12 by each of the heads 1Y, 1M and 1C. Optionally but preferably, a head cleaner 23 is provided, reciprocally movable in the y-direction as shown, for wiping heads 1Y, 1M and 1C as may be required in operation. In this way, printing can be started with different timings for the respective colors, and thus a color image can be printed by one scan.

A color printer comprising heads formed in a line can be used in place of the serial printer shown in FIG. 5.

The recording solutions used for the serial printer will be described in detail below with reference to the examples and comparative examples.

Example 1

An yellow recording solution, a magenta recording solution and a cyan recording solution for vaporization type heat transfer recording were prepared by mixing the dye, solvent and compatibilizer shown in Table 4 at a dye/solvent/compatibilizer ratio by weight of 1:1:1.

For reference, Table 5 shows the solubility (% by weight) of each of the dyes used in Example 1 in the corresponding solvent and the solubility (% by weight) thereof in a mixture of the corresponding solvent and compatibilizer at 1:1.

TABLE 4

| | Recoring Solution | | |
|---|---|---|---|
| | Yellow | Magenta | Cyan |
| Dye | Solvent Yellow 56 | Disperse Red 1 | Solvent Blue 35 |
| Vaporization sart temperature (° C.) | 258 | 315 | 320 |
| Solvent | 1-phenyl naphthalene | Di-n-octyl phthalate | Di-n-octyl phthalate |
| Melting point (° C.) | <0 | −25 | −25 |
| Vaporization sart temperature (° C.) | 231 | 304 | 304 |
| Boiling point (° C.) | 325 | — | — |
| Compatibilzer | 7,8-benzoquinone | Triphenyl phosphate | Triphenylene |
| Melting point (° C.) | — | — | — |
| Vaporization sart temperature (° C.) | 246 | 280 | 298 |
| Boiling point (° C.) | 340 | 377 | 438 |
| Dye/solvent/ compatibilizer wt ratio | 15/50/35 | 15/50/35 | 8/52/40 |
| Difference between vaporization start temperatures (° C.) | 12–27 | 11–24 | 6–22 |

TABLE 5

| Dye | Solubility in solvent | (% by weight) Solubility in solvent + compatibilizer |
|---|---|---|
| Solvent Yellow | 18.6 | 32.1 |
| Disperse Red 1 | 12.1 | 20.0 |
| Solvent Blue 35 | 4.6 | 8.4 |

Table 4 indicates that the recording solution of each color has a difference of 50° C. or less between the vaporization start temperatures or the boiling points of any desired two of the dye, solvent and compatibilizer. Table 5 indicates that addition of the compatibilizer significantly increases the solubility of the dye, as compared with the case of a single solvent.

When the resultant recording solution of each of the colors was introduced into the ink tank of the transfer chip through the recording solution introducing hole of the printer head shown in FIG. 1, the recording solution was spontaneously introduced into the vaporization portion at the end of the recording heater chip through the path.

The pulse voltage below was applied to the heaters of the printer head for each color to thermally transfer the recording solution to the photographic paper.

Conditions of Pulse Voltage

Yellow: 70 mW, for one gradation, an on time of 10 μs and an off time of 12 μs for one pulse, 256 pulses for one dot Magenta: 72 mW, the same as yellow Cyan: 78 mW, the same as yellow In heat transfer under the above conditions, dots of each of the colors could be formed on A-6 photographic paper with an optical density of 2.5 which was measured by a Macbeth reflection type.

When continuing this tranfer, burning occurred in the column portion of the printer head of cyan color of the three colors, and the cyan color could not be transferred. However, printing could be made on as a large number of sheets as 8600.

Comparative Example 1

In order to prepare recording solutions of the yellow, magenta and cyan colors, the same dyes as Example 1, i.e., Solvent Yellow 56, Disperse Red 1 and Solvent Blue 35, were used as dyes. As the solvent, 1-ethylnaphthalene (the vaporization start temperature 160° C.) was used. The solubility of each of the dyes in the solvent at 40° C. was as shown in Table 6.

Recording solutions of the colors were prepared by mixing the dyes and the solvent according to a normal method, without using the compatibilizer.

TABLE 6

| Dye | Solubility in 1-ethyl naphtalene (wt %) |
|---|---|
| Solvent Yellow 56 | 45.8 |
| Disperse Red 1 | 40.7 |
| Solvent Blue 35 | 22.5 |

TABLE 7

| | Recoring Solution | | |
|---|---|---|---|
| | Yellow | Magenta | Cyan |
| Dye | Solvent Yellow 56 | Disperse Red 1 | Solvent Blue 35 |
| Vaporization sart temperature (° C.) | 258 | 315 | 320 |
| Solvent | 1-ethyl naphthalene | 1-ethyl naphthalene | 1-ethyl naphthalene |
| Vaporization sart temperature (° C.) | 160 | 160 | 160 |
| Boiling point (° C.) | 325 | — | — |
| Dye/solvent/ wt ratio | 15/85 | 15/85 | 10/90 |
| Difference between vaporization start temperatures (° C.) | 98 | 155 | 160 |

Table 6 reveals that the solubility of each dye in 1-ethylnaphthalene is higher than that in a mixture of the solvent and compatibilizer used in Example 1.

However, in the same heat transfer as Example 1 using each of the color recording soluions, burning coccurred in the cyan printer portion at the time of printing on 1300 sheets of A-6 paper, and the cyan color could not be transferred. This indicates that burning easily occurs if the compatibilizer is not used.

Comparative Example 2

In order to prepare recording solutions of the yellow, magenta and cyan colors, the same dyes as Example 1, i.e., Solvent Yellow 56, Disperse Red 1 and Solvent Blue 35, were used as dyes. As the solvent, 1-phenylnaphthalene (the vaporization start temperature 231° C.) was used.

Recording solutions of the colors were prepared by mixing these dyes and the solvent at the ratio shown in table 8 according to a normal method, without using the compatibilizer.

TABLE 8

| | Recoring Solution | | |
|---|---|---|---|
| | Yellow | Magenta | Cyan |
| Dye | Solvent Yellow 56 | Disperse Red 1 | Solvent Blue 35 |
| Vaporization sart temperature (° C.) | 258 | 315 | 320 |
| Solvent | 1-phenyl naphthalene | 1-phenyl naphthalene | 1-phenyl naphthalene |
| Melting point (C.) | <0 | <0 | <0 |
| Vaporization sart temperature (° C.) | 231 | 231 | 231 |
| Boiling point (° C.) | 325 | — | — |
| Dye/solvent/ wt ratio | 15/85 | 15/85 | 10/90 |
| Difference between vaporization start temperatures (° C.) | 67 | 10 | 5 |

However, in the same heat transfer as Example 1 using each of the color recording soluions, burning cocurred in the cyan printer portion at the time of printing on 2400 sheets of A-6 paper, and the cyan color could not be transferred. This indicates that burning easily occurs if the compatibilizer is not used.

The recording solution for vaporization type heat transfer recording of the present invention can increase the dye density, and set the vaporization start temperatures of the solvent and the dye at substantially the same temperature. In a transfer process, therefore, the solvent is not vaporized before the dye. It is thus possible to prevent precipitation in the transfer process, and decresase the occurrence of burning in the vaporization portion caused by the precipitation, thereby increasing the number of sheets on which printing can be performed by one printer head.

What is claimed is:

1. A recording solution for vaporization heat transfer recording in which the recording solution is transferred to a recording material by vaporization, comprising a dye, a solvent having a melting point of room temperature or less, and a compatibilizer for increasing the solubility of the dye in the solvent, wherein a difference between vaporization start temperatures of any two of the dye, the solvent and the compatibilizer is 100° C. or less, said vaporization start temperature being defined as a temperature at which a weight loss by vaporization is 10% in a thermogravimetric analysis at a rate of temperature rise of 20° C./min.

2. A recording solution for vaporization heat transfer recording according to claim 1, wherein the difference between the vaporization start temperatures of any two of the dye, the solvent and the compatibilizer is 50° C. or less.

3. A recording solution for vaporization heat transfer recording according to claim 1, wherein the solvent is selected from the group consisting of a solvent having a melting point of 0° C. or less and a solvent having a melting point which is lowered to 0° C. or less due to the phenomenon of lowering of melting point when the dye and the compatibilizer are dissolved in the solvent.

4. A recording solution for vaporization heat transfer recording according to claim 1, wherein the dye is any one of disperse dyes, oil-soluble dyes, basic dyes and acid dyes, or a mixture thereof.

5. A recording solution for vaporization heat transfer recording according to claim 1, wherein the dye is a disperse dye, and the solvent is at least one selected from the group consisting of di-n-octyl phthalate, dioctyl phthalate, isodecyl phthalate, tricresyl phosphate, 1-phenylnaphthalene, 1,2-propanediol dibenzoate, and trihexyl trimellitate.

6. A recording solution for vaporization heat transfer recording according to claim 5, wherein the solvent is 1-phenylnaphthalene, and the compatibilizer is 7,8-benzoquinoline.

7. A recording solution for vaporization heat transfer recording according to claim 5, wherein the solvent is di-n-octyl phthalate, and the compatibilizer is triphenyl phosphate.

8. A recording solution for vaporization heat transfer recording according to claim 5, wherein the solvent is di-n-octyl phthalate, and the compatibilizer is triphenylene.

9. A recording solution for vaporization heat transfer recording according to claim 1, wherein the content of the compatibilizer in the recording solution is 1 to 40% by weight.

10. A recording solution for vaporization heat transfer recording according to claim 9, wherein the content of the compatibilizer in the recording solution is 35 to 40% by weight.

* * * * *